US011701973B2

(12) United States Patent
Tomonaga et al.

(10) Patent No.: US 11,701,973 B2
(45) Date of Patent: Jul. 18, 2023

(54) ROTORCRAFT AND METHOD OF CONTROLLING ROTORCRAFT

(71) Applicant: SUBARU CORPORATION, Tokyo (JP)

(72) Inventors: Yukinobu Tomonaga, Tokyo (JP); Yu Takahashi, Tokyo (JP); Yohei Matsuguma, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 860 days.

(21) Appl. No.: 16/589,942

(22) Filed: Oct. 1, 2019

(65) Prior Publication Data
US 2020/0150693 A1 May 14, 2020

(30) Foreign Application Priority Data

Nov. 12, 2018 (JP) .................................. 2018-211862

(51) Int. Cl.
*B60L 50/60* (2019.01)
*B64C 39/02* (2023.01)
(Continued)

(52) U.S. Cl.
CPC ............... *B60L 50/60* (2019.02); *B60L 53/50* (2019.02); *B64C 27/28* (2013.01); *B64C 37/02* (2013.01);
(Continued)

(58) Field of Classification Search
CPC ......... B64C 27/28; B64C 27/52; B64C 37/02; B64C 2201/024; B64C 2201/066;
(Continued)

(56) References Cited

U.S. PATENT DOCUMENTS 9,452,830 B2 * 9/2016 D'Anna ................... B64C 27/14
10,723,457 B2 * 7/2020 Tillotson ................ B64D 27/24
(Continued)

FOREIGN PATENT DOCUMENTS

CN 207060394 U 3/2018
CN 108750092 A 11/2018
(Continued)

OTHER PUBLICATIONS

Japanese Notice of Reasons for Refusal issued in corresponding Japanese Patent Application No. 2018-211862, dated Sep. 8, 2022, with English translation.

*Primary Examiner* — Richard Green
*Assistant Examiner* — Arfan Y. Sinaki
(74) *Attorney, Agent, or Firm* — McDermott Will & Emery LLP

(57) ABSTRACT

According to one implementation, a rotorcraft includes a first rotorcraft and at least one second rotorcraft. The first rotorcraft has a first main rotor and a first tail rotor. The at least one second rotorcraft has a second main rotor and a second tail rotor. The at least one second rotorcraft are attachable and detachable to and from the first rotorcraft. Further, according to one implementation, a method of controlling the above-mentioned rotorcraft includes: flying the first rotorcraft, to which the at least one second rotorcraft has been attached, to a destination; and separating the at least one second rotorcraft from the first rotorcraft at the destination.

12 Claims, 8 Drawing Sheets

(51) Int. Cl.
*B64C 37/02* (2006.01)
*B60L 53/50* (2019.01)
*B64C 27/28* (2006.01)
*B64U 10/10* (2023.01)
*B64U 50/19* (2023.01)
*B64U 50/34* (2023.01)

(52) U.S. Cl.
CPC ......... *B64C 39/024* (2013.01); *B60L 2200/10* (2013.01); *B64U 10/10* (2023.01); *B64U 50/19* (2023.01); *B64U 50/34* (2023.01)

(58) Field of Classification Search
CPC ........ B64C 2201/082; B64C 2201/206; B64C 39/00; B64C 2211/00; B64C 2211/143; B64D 5/00; B64D 3/00
See application file for complete search history.

(56) References Cited

U.S. PATENT DOCUMENTS

| | | | |
|---|---|---|---|
| 2015/0115096 A1* | 4/2015 | Rossi | B64C 37/02 244/2 |
| 2020/0039639 A1* | 2/2020 | Sinusas | B64C 19/02 |

FOREIGN PATENT DOCUMENTS

| | | |
|---|---|---|
| EP | 3 072 818 A1 | 9/2016 |
| JP | 2015-191254 A | 11/2015 |
| JP | 2016-064768 A | 4/2016 |

* cited by examiner

ROTORCRAFT AND METHOD OF CONTROLLING ROTORCRAFT

CROSS REFERENCES TO RELATED APPLICATIONS

This application is based upon and claims the benefit of priority from Japanese Patent Application No. 2018-211862, filed on Nov. 12, 2018; the entire contents of which are incorporated herein by reference.

FIELD

Implementations described herein relate generally to a rotorcraft and a method of controlling a rotorcraft.

BACKGROUND

Conventionally, a multicopter which can house slave rotorcrafts has been suggested as a rotorcraft which can carry out missions at a plurality of loci simultaneously (for example, refer to Japanese Patent Application Publication JP2016-064768 A). A multicopter is a kind of a helicopter, and is a rotorcraft which has not less than three rotors.

Moreover, a method of remotely controlling an unmanned aircraft, which functions as a slave rotorcraft, by another unmanned aircraft, which functions as a master rotorcraft, through wireless communication has also been suggested (for example, refer to Japanese Patent Application Publication JP2015-191254 A).

An object of the present invention is to provide a rotorcraft and a method of controlling a rotorcraft which can carry out missions at loci simultaneously with easier maneuvering.

SUMMARY OF THE INVENTION

In general, according to one implementation, a rotorcraft includes a first rotorcraft and at least one second rotorcraft. The first rotorcraft has a first main rotor and a first tail rotor. The at least one second rotorcraft has a second main rotor and a second tail rotor. The at least one second rotorcraft is attachable to and detachable from the first rotorcraft.

Further, according to one implementation, a method of controlling the above-mentioned rotorcraft includes: flying the first rotorcraft, to which the at least one second rotorcraft has been attached, to a destination; and separating the at least one second rotorcraft from the first rotorcraft at the destination.

DETAILED DESCRIPTION

A rotorcraft and a method of controlling a rotorcraft according to implementations of the present invention will be described with reference to the accompanying drawings.
(Structure and Function of Rotorcraft)

Figure 1:
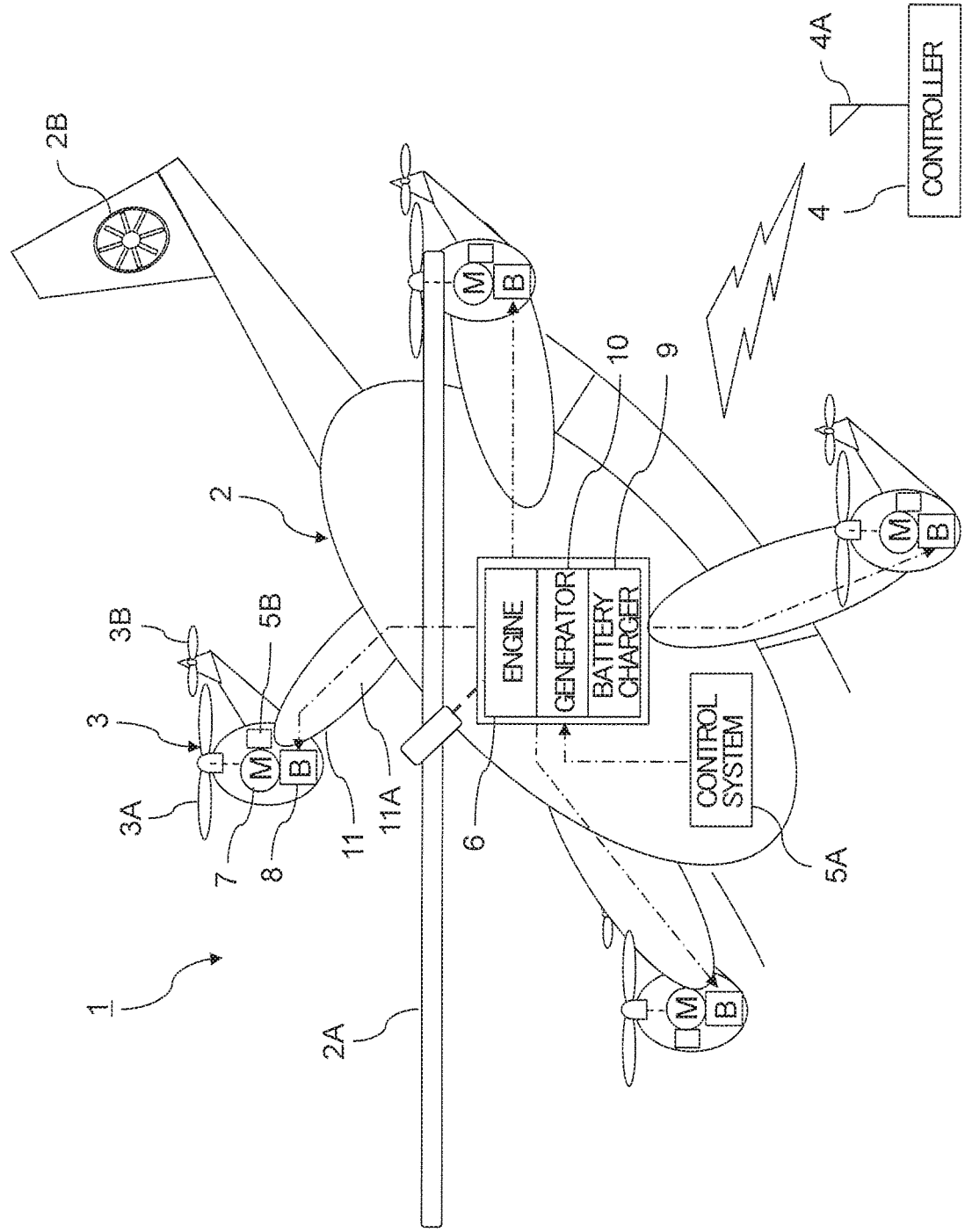
FIG. 1 is a perspective view showing a structure of a rotorcraft according to an implementation of the present invention.

FIG. 1 is a perspective view showing a structure of a rotorcraft according to an implementation of the present invention.

A rotorcraft 1 has a master rotorcraft 2 and one or more slave rotorcrafts 3 which can be attached to and detached from the master rotorcraft 2. Although FIG. 1 shows an example in which four slave rotorcrafts 3 are coupled to the master rotorcraft 2, the number of the slave rotorcrafts 3 is flexible.

The master rotorcraft 2 is a first rotorcraft which has a first main rotor 2A and a first tail rotor 2B. That is, the master rotorcraft 2 can fly as an independent first rotorcraft regardless of whether the slave rotorcrafts 3 are coupled to the master rotorcraft 2. Although the first tail rotor 2B is a ducted fan surrounded by an annular duct in an example shown in FIG. 1, the first tail rotor 2B may have another structure.

On the other hand, each of the slave rotorcrafts 3 is a second rotorcraft which has a second main rotor 3A and a second tail rotor 3B. That is, each of the slave rotorcrafts 3 can fly as an independent second rotorcraft even when the slave rotorcraft 3 is not coupled to the master rotorcraft 2.

The master rotorcraft 2 and the slave rotorcrafts 3 may be a manned aircraft or an unmanned aircraft. Whether to make the master rotorcraft 2 and the slave rotorcrafts 3 manned aircrafts or unmanned aircrafts may be determined according to respective missions of the master rotorcraft 2 and the slave rotorcrafts 3 and/or needs of a user. When each of the master rotorcraft 2 and the slave rotorcrafts 3 is an unmanned aircraft, there is an advantage that no pilot is necessary leading to improvements in safety, particularly in a case of a defensive purpose.

Examples of the missions of the master rotorcraft 2 and the slave rotorcrafts 3 include a checkup of an infrastructure, such as a road, a railroad, a water and sewerage, a power transmission network, a port, a dam, and a communication facility, as well as transmission of voices or radio waves for broadcasting, photographing from the sky, and defensive missions. Examples of defensive missions include a mission of loading explosives on some or all of the master rotorcraft 2 and the slave rotorcrafts 3 to detonate the explosives at a target area, and a mission to fly as multiple targets.

When each of the master rotorcraft 2 and the slave rotorcrafts 3 is an unmanned aircraft, the master rotorcraft 2 and each of the slave rotorcrafts 3 can be maneuvered from a remote place by wirelessly transmitting control signals from a controller 4 having a wireless device 4A to a control system 5A mounted on the master rotorcraft 2 and to a control system 5B mounted on each of the slave rotorcrafts 3 as exemplified by FIG. 1. Alternatively, the master rotorcraft 2 and each of the slave rotorcrafts 3 may fly on automatic pilot by installing flight programs in advance in the control system 5A mounted on the master rotorcraft 2 and in the control system 5B mounted on each of the slave rotorcrafts 3.

An engine 6, such as a reciprocating engine or a gas turbine engine, or motors 7 may be used to rotate the first main rotor 2A and the first tail rotor 2B of the master rotor craft 2 and to rotate the second main rotors 3A and the second tail rotors 3B of the slave rotorcrafts 3. Alternatively, both of the engine 6 and the motors 7 are used to rotate the first main rotor 2A and the first tail rotor 2B of the master rotorcraft 2 and to rotate the second main rotors 3A and the second tail rotors 3B of the slave rotorcrafts 3. As a practical example, the motors 7 may be rotated using the power of the engine 6, and all of the rotors may be rotated using the motors 7.

In general, as the rotorcraft becomes larger, an engine that is large enough to generate a large amount of power must be mounted on the rotorcraft. On the contrary, as the rotorcraft becomes smaller, an electric-powered rotorcraft that is easy to maintain is adopted.

Accordingly, with respect to the master rotorcraft 2 to which the slave rotorcrafts 3 are coupled, it is practical to use, as the master rotorcraft 2, a large-sized rotorcraft in which the first main rotor 2A and the first tail rotor 2B are rotated using the engine 6 as exemplified in FIG. 1. As a matter of course, the engine 6 may be used to rotate the motors 7, and the motors 7 may be used to rotate the first main rotor 2A and the first tail rotor 2B as mentioned above.

On the contrary, for each of the slave rotorcrafts 3, it is practical to use, as the slave rotorcraft 3, a small-sized rotorcraft in which the electric second main rotor 3A and the electric second tail rotor 3B are rotated using only the motor 7 and without using the engine 6.

In this case, each of the slave rotorcrafts 3 includes a battery 8 that supplies electric power to the motor 7 to rotate the second main rotor 3A and the second tail rotor 3B. Thus, at least one of a battery charger 9 and a generator 10 may be mounted in the master rotorcraft 2 to charge the battery 8 mounted on each of the slave rotorcrafts 3 while the slave rotorcrafts 3 are coupled to the master rotorcraft 2.

As a practical example, both of the battery charger 9, which is composed of a battery, and the generator 10, which generates an electric power by the power of the engine 6, can be mounted in the master rotorcraft 2 as shown in FIG. 1. In this case, the batteries 8 of the slave rotorcrafts 3 can be charged using electric power generated by the generator 10, and surplus electric power can be supplied to the battery charger 9. Then, when the battery charger 9 is charged with electric power, the batteries 8 of the slave rotorcrafts 3 can be charged also using the electric power from the battery charger 9.

Each of the slave rotorcrafts 3 to be charged is coupled to the master rotorcraft 2 by a detachable structure 11. Therefore, it is necessary to charge the battery 8 of the slave rotorcraft 3 through the detachable structure 11. Accordingly, a charging method can be determined according to the detachable structure 11.

In an example shown in FIG. 1, the detachable structure 11 has a detachable arm 11A, and each of the slave rotorcrafts 3 is configured so that the slave rotorcraft 3 can be separated from and coupled to the master rotorcraft 2 while in flight and during landing. A method of attaching and detaching the slave rotorcrafts 3 to and from the detachable arms 11A of the master rotorcraft 2 is flexible.

Figure 2:
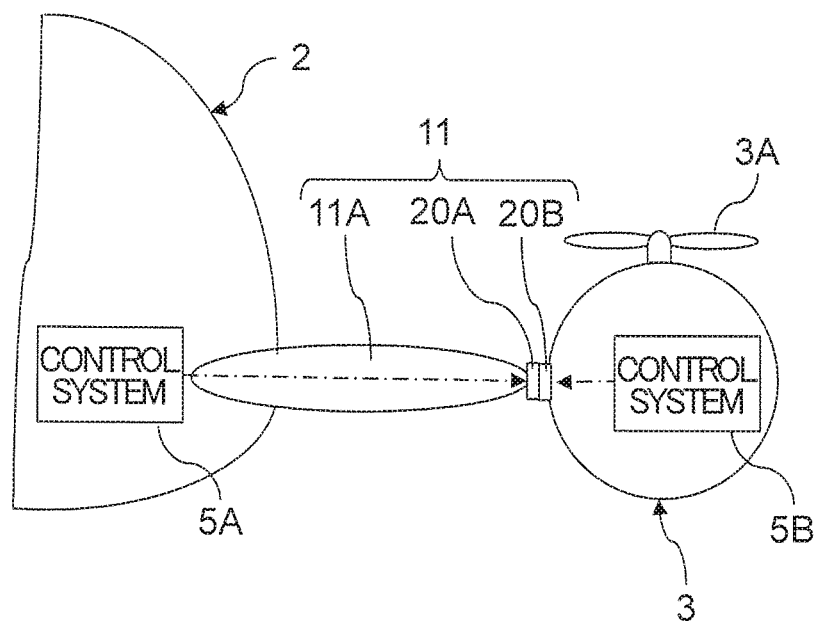
FIG. 2 shows the first specific example of a detachable structure shown in FIG. 1.

FIG. 2 shows the first specific example of the detachable structure 11 shown in FIG. 1.

As a specific example, as shown in FIG. 2, electromagnets 20A and 20B can be attached to at least one of the master rotorcraft 2 and the slave rotorcraft 3. The electromagnets 20A and 20B may control generations of magnetic forces. The electromagnets 20A and 20B can be controlled by the control system 5A and the control system 5B. Then, the slave rotorcraft 3 can be attached to and detached from the master rotorcraft 2 by switching ON and OFF the magnetic forces of the electromagnets 20A and 20B using control signals transmitted from the control system 5A and the control system 5B to the electromagnet 20A and the electromagnet 20B.

Figure 3:
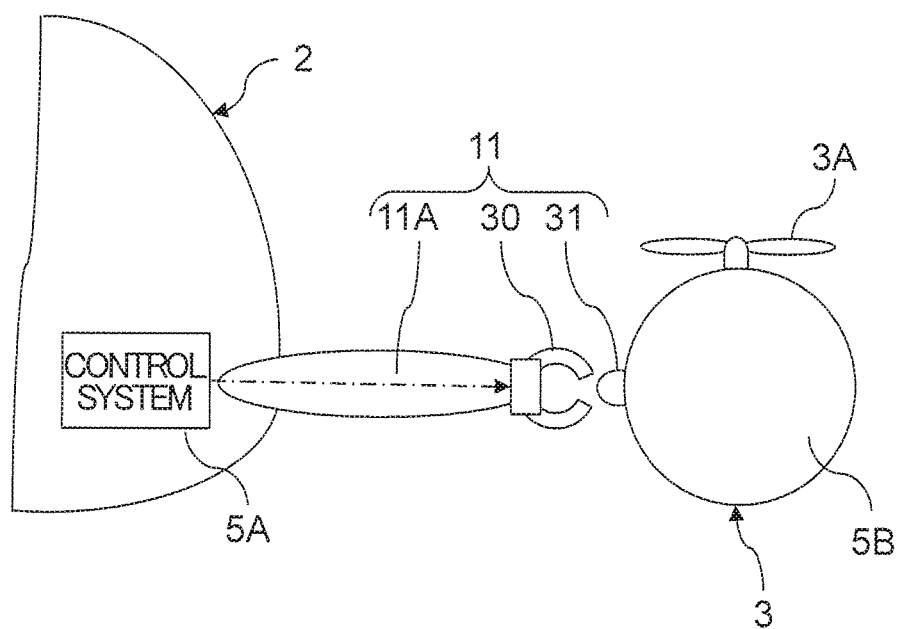
FIG. 3 shows the second specific example of the detachable structure shown in FIG. 1.

FIG. 3 shows the second specific example of the detachable structure 11 shown in FIG. 1.

As another specific example, as shown in FIG. 3, a hand 30, which opens and closes by the control system 5A, is attached on the tip of the detachable arm 11A on the master rotorcraft 2 side, and a coupling shaft 31 is attached to the slave rotorcraft 3. Thus, a coupling structure in which the hand 30 on the master rotorcraft 2 side holds the coupling shaft 31 on the slave rotorcraft 3 side may be adopted as the detachable structure 11. In this case, the slave rotorcraft 3 is attached to and detached from the master rotorcraft 2 by controlling the opening and closing of the hand 30.

Figure 4:
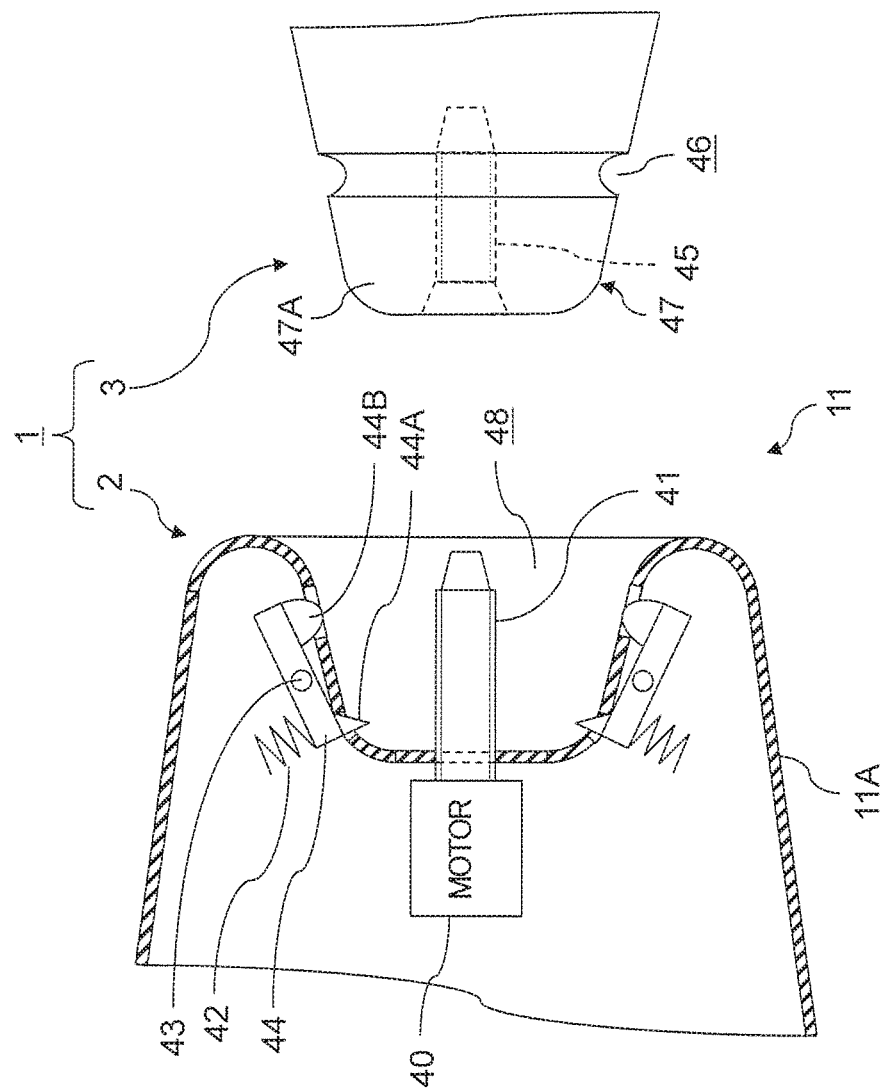
FIG. 4 is an enlarged longitudinal sectional view showing the third specific example of the detachable structure shown in FIG. 1.
Figure 5:
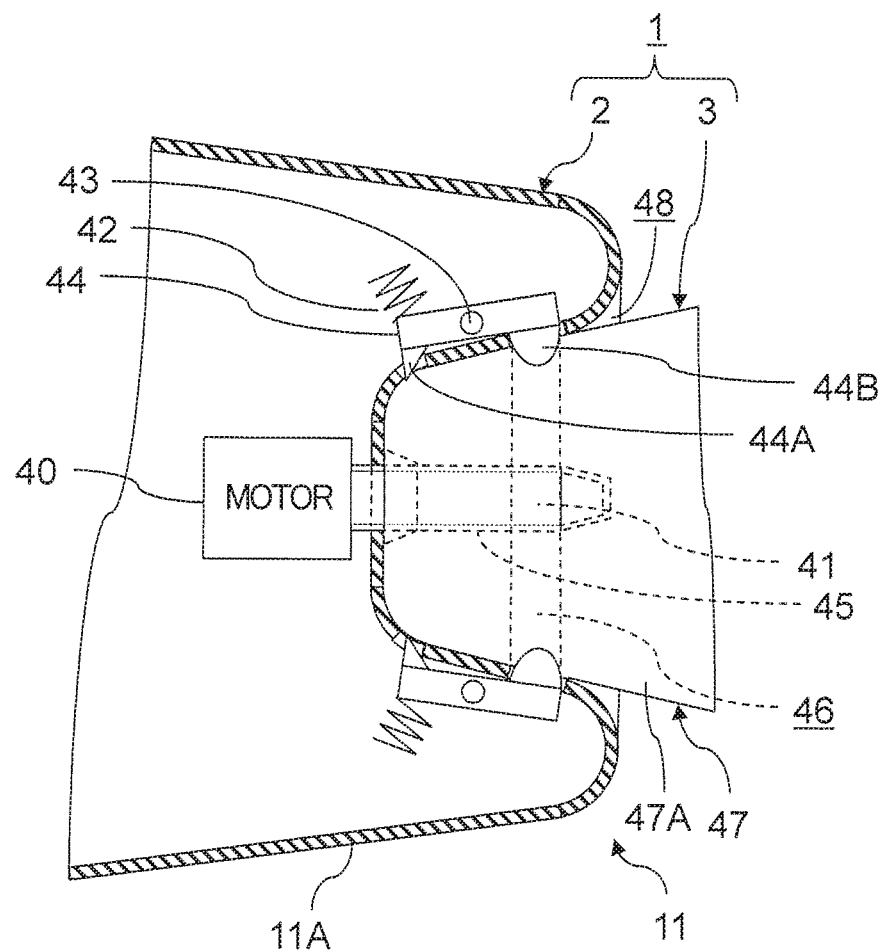
FIG. 5 is an enlarged longitudinal sectional view showing the detachable structure shown in FIG. 4 in a docked state.

FIG. 4 is an enlarged longitudinal sectional view showing the third specific example of the detachable structure 11 shown in FIG. 1. FIG. 5 is an enlarged longitudinal sectional view showing the docked detachable structure 11 shown in FIG. 4.

Yet as another specific example, as shown in FIG. 4, the detachable structure 11 includes a motor 40, a ball screw 41, springs 42, rotating shafts 43, stoppers 44, a female screw 45, a groove 46, and a projection 47. Specifically, the ball screw 41 rotated by the motor 40, and the stoppers 44, which respectively rotate around the rotating shafts 43 by expansion and contraction of the respective springs 42, are attached to the tip of the detachable arm 11A on the master rotorcraft 2 side. Meanwhile, the female screw 45 and the projection 47 having the groove 46 for fitting the stoppers 44 are formed in the slave rotorcraft 3. The tip of the detachable arm 11A on the master rotorcraft 2 side has a concave portion 48 which mates with the projection 47 of the slave rotorcraft 3. The tip of the ball screw 41 and the front end or the rear end of each stopper 44 are projected inside the concave portion 48. The number of the stoppers 44 is flexible. For example, two to four stoppers 44 can be placed at even intervals along a circle whose center is the rotation axis of the ball screw 41.

In a case where the detachable structure 11 has a structure as exemplified in FIG. 4, the motor 40 is driven to fasten the ball screw 41 on the master rotorcraft 2 side to the female screw 45 the slave rotorcraft 3 side to pull the projection 47 on the slave rotorcraft 3 side toward the concave portion 48 formed on the detachable arm 11A in the master rotorcraft 2 side.

As exemplified in FIG. 4, when the projection 47 of the slave rotorcraft 3 is not inserted into the concave portion 48 at the tip of the detachable arm 11A, a convex portion 44A formed at the rear end of each of the stoppers 44 protrudes into the concave portion 48 by the elastic force of the spring 42. Meanwhile, as exemplified in FIG. 5, when the projection 47 of the slave rotorcraft 3 is inserted into the concave portion 48 at the tip of the detachable arm 11A, each of the springs 42 contracts contract due to the end part of the projection 47 of the slave rotorcraft 3 being pressed against the respective convex portions 44A formed at the rear ends of the stoppers 44. As a result, the stoppers 44 respectively rotate around the rotating shafts 43, and convex portions 44B respectively formed at the end parts of the stoppers 44 project into the concave portion 48. The convex portions 44B, which are formed at the end parts of the stoppers 44 project inside the concave portion 48, fit into the groove 46 formed on the projection 47 of the slave rotorcraft 3. Thereby, the slave rotorcraft 3 is held by the detachable arm 11A of the master rotorcraft 2.

As exemplified in FIGS. 4 and 5, a typical rotorcraft has stub wings (small wings) 47A. The stub wings 47A are short wings projecting from the left and right of the fuselage. Accordingly, when the slave rotorcraft 3 includes the stub wings 47A, at least one of the stub wings 47A is used as the projection 47 to allow the stub wings 47A to be inserted into the concave portion 48 on the master rotorcraft 2 side. Similarly, the electromagnet 20B exemplified in FIG. 2 or the coupling shaft 31 exemplified in FIG. 3 may also be attached to at least one of the stub wings 47A of the slave rotorcraft 3.

As mentioned above, in the state where the slave rotorcraft 3 is docked to the master rotorcraft 2, the battery 8 of the slave rotorcraft 3 is charged by the battery charger 9 and the generator 10 of the master rotorcraft 2. When the battery 8 of the slave rotorcraft 3 is charged by the battery charger 9 and the generator 10 of the master rotorcraft 2, a charging method according to a structure of the detachable structure 11 is adopted. As concrete examples of a method of charging the battery 8 of the slave rotorcraft 3 by the battery charger 9 and the generator 10 of the master rotorcraft 2 through the detachable structure 11, there are a method of power feeding by using a slip ring or the like to form electric contact points on both the master rotorcraft 2 and the slave rotorcraft 3 and allowing the electric contact points to be mechanically contact each other, and a method of wireless power feeding. When the battery 8 of the slave rotorcraft 3 is charged by a wireless power feeding method, wireless devices for the wireless power feeding are respectively provided in the master rotorcraft 2 and the slave rotorcraft 3.

Figure 6:
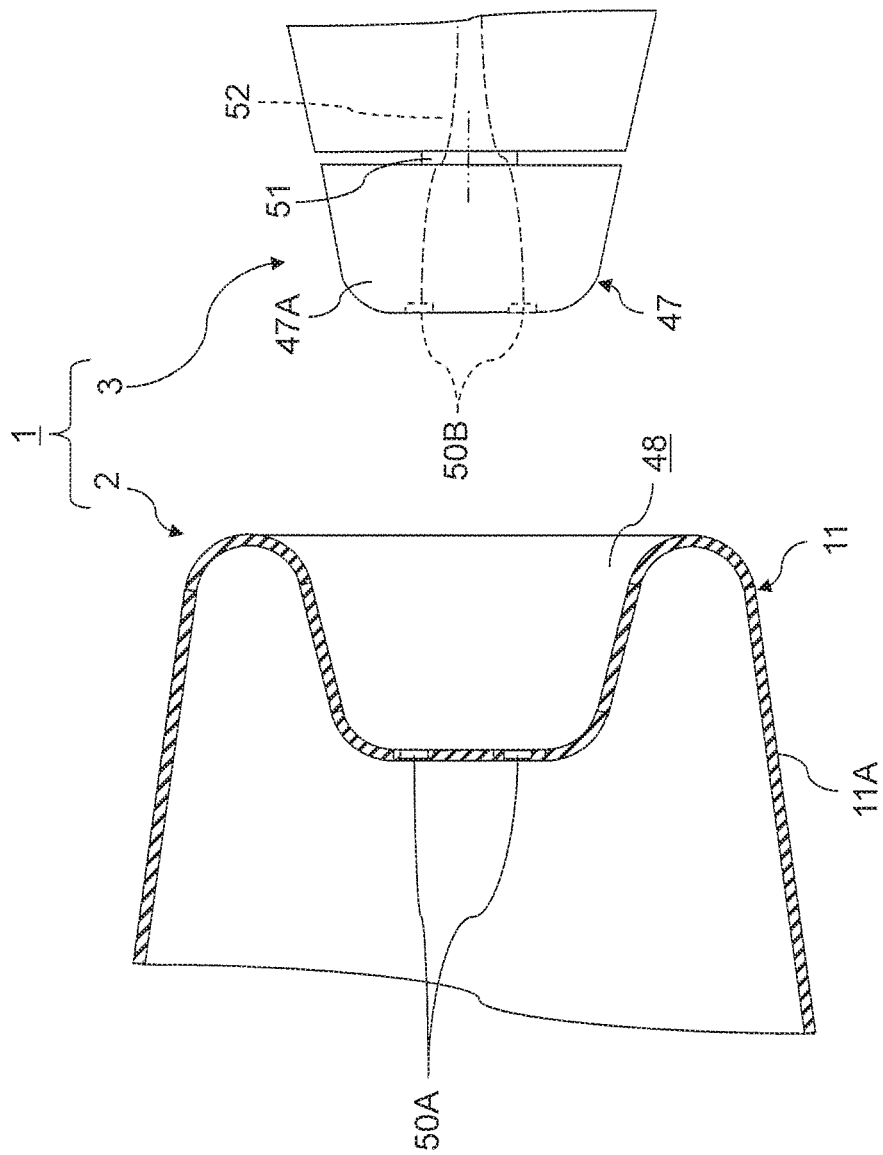
FIG. 6 shows an example of a structure for supplying an electric power to a battery in each of slave rotorcrafts from a master rotorcraft shown in FIG. 1.
Figure 7:
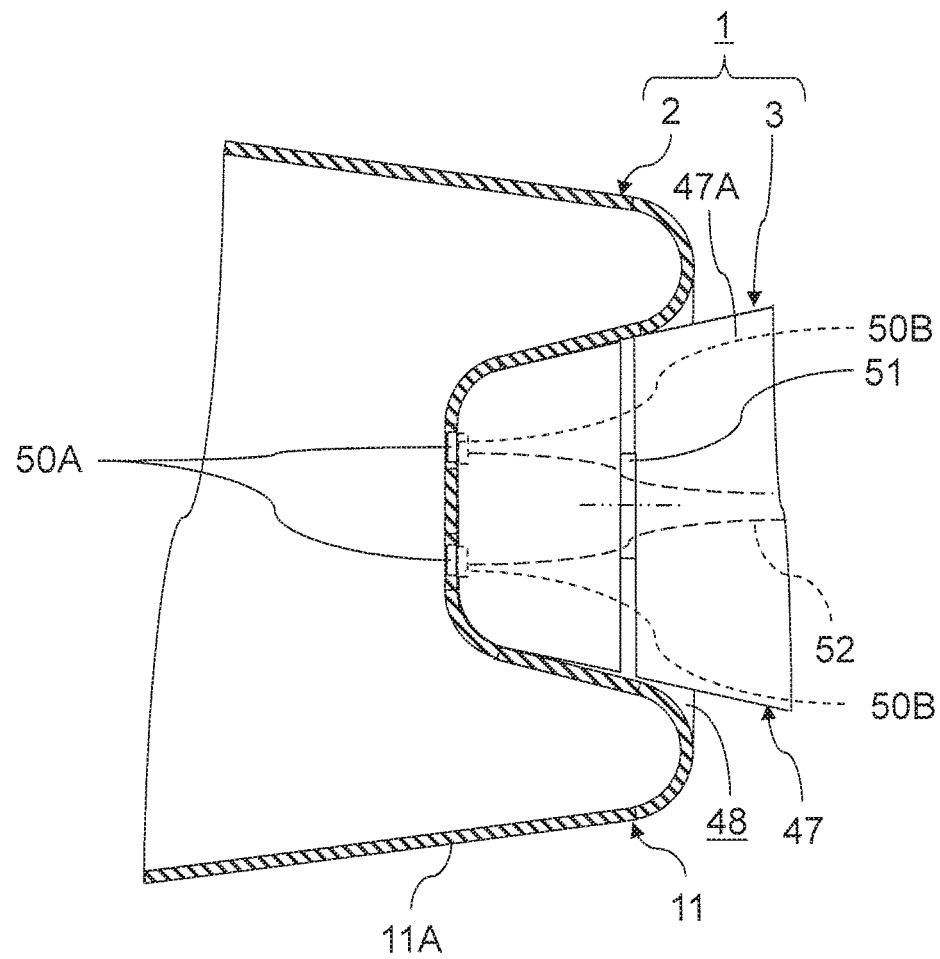
FIG. 7 shows a state where the slave rotorcraft is docked to a detachable arm of the master rotorcraft shown in FIG. 6.

FIG. 6 shows an example of a structure for supplying electric power to the battery 8 in the slave rotorcraft 3 from the master rotorcraft 2 shown in FIG. 1. FIG. 7 shows a state where the slave rotorcraft 3 is docked to the detachable arms 11A of the master rotorcraft 2 shown in FIG. 6.

As illustrated in FIG. 6, when the slave rotorcraft 3 has the projections 47, such as the stub wings 47A, the concave portion 48 for fitting the projection 47 of the slave rotorcraft 3 is formed at the tip of the detachable arm 11A of the master rotorcraft 2, as similarly shown in FIGS. 4 and 5. Then, an electric supply port 50A and an electric supply port 50B for supplying electric power are provided to the concave portion 48 formed at the tip of the detachable arm 11A of the master rotorcraft 2 and the projection 47 of the slave rotorcraft 3.

More specifically, the electric supply port 50A and the electric supply port 50B that serve as mechanical contact points e are disposed on the concave portion 48 formed at the tip of the detachable arm 11A of the master rotorcraft 2 and the projection 47 of the slave rotorcraft 3 so that the mechanical contact points may contact each other when the slave rotorcraft 3 is docked to the master rotorcraft 2 by inserting the projection 47 in the concave portion 48 as exemplified in FIG. 7. Alternatively, at least one pair of the non-contact electric supply port 50A and the non-contact electric supply port 50B for feeding power wirelessly may be disposed on the projection 47 of the slave rotorcraft 3 and the concave portion 48 formed at the tip of the detachable arm 11A of the master rotorcraft 2.

It is appropriate to apply waterproof treatment to the electric supply port 50A and the electric supply port 50B. This is due to the electric supply port 50A disposed on the concave portion 48 and the electric supply port 50B disposed on the projection 47 being exposed to the weather while the slave rotorcraft 3 is separated from the master rotorcraft 2.

Each of the stub wings 47A of the slave rotorcraft 3 may have a tilt function. In that case, as exemplified in FIG. 6 and FIG. 7, a harness 52 for feeding power is disposed inside a rotation shaft 51 of at least one of the stub wings 47A to tilt the stub wing 47A. Alternatively, power may be supplied wirelessly between the stub wing 47A and the fuselage of the slave rotorcraft 3. Thereby, even when the stub wings 47A are tilted, interference of the stub wing 47A with the harness 52 can be avoided. In other words, at least one electric supply port 50B can be disposed at the end part of the stub wing 47A having the tilt function.

When all of the master rotorcraft 2 and the slave rotorcrafts 3 are unmanned aircrafts, not only is the maneuvering of the master rotorcraft 2 and the slave rotorcrafts 3 controlled remotely, but also the attachment and detachment of each slave rotorcraft 3 to and from the master rotorcraft 2 and the charging of the batteries 8 of the slave rotorcrafts 3 are remotely controlled using the wireless transmissions of control signals from the controller 4 to the control system 5A of the master rotorcraft 2 and the control systems 5B of the slave rotorcrafts 3, or automatically controlled by flight programs stored in advance in the control system 5A of the master rotorcraft 2 and the control systems 5B of the slave rotorcrafts 3.

As a matter of course, when only the master rotorcraft 2 is a manned aircraft, a pilot of the master rotorcraft 2 performs the attachment and detachment of each of the slave rotorcrafts 3 to and from the master rotorcraft 2 and the charging of the batteries 8 of the slave rotorcrafts 3 by manually operating the control system 5A of the master rotorcraft 2 and the control systems 5B of the slave rotorcrafts 3. Meanwhile, when at least one of the slave rotorcrafts 3 is a manned aircraft, a pilot of the slave rotorcraft 3 side performs the attachment and detachment of each of the slave rotorcrafts 3 to and from the master rotorcraft 2 and the charging of the batteries 8 of the slave rotorcrafts 3 by manually operating the control system 5A of the master rotorcraft 2 and the control systems 5B of the slave rotorcrafts 3.

On the contrary, even when at least one of the master rotorcraft 2 and the slave rotorcrafts 3 is a manned aircraft, the attachment and detachment of each of the slave rotorcrafts 3 to and from the master rotorcraft 2 and the charging of the batteries 8 of the slave rotorcrafts 3 are performed by remote operations with wireless transmissions of control signals from the controller 4 to the control system 5A of the master rotorcraft 2 and the control systems 5B of the slave rotorcrafts 3, or by automatic controls based on flight programs previously stored in the control system 5A of the master rotorcraft 2 and the control systems 5B of the slave rotorcrafts 3.

Figure 8:
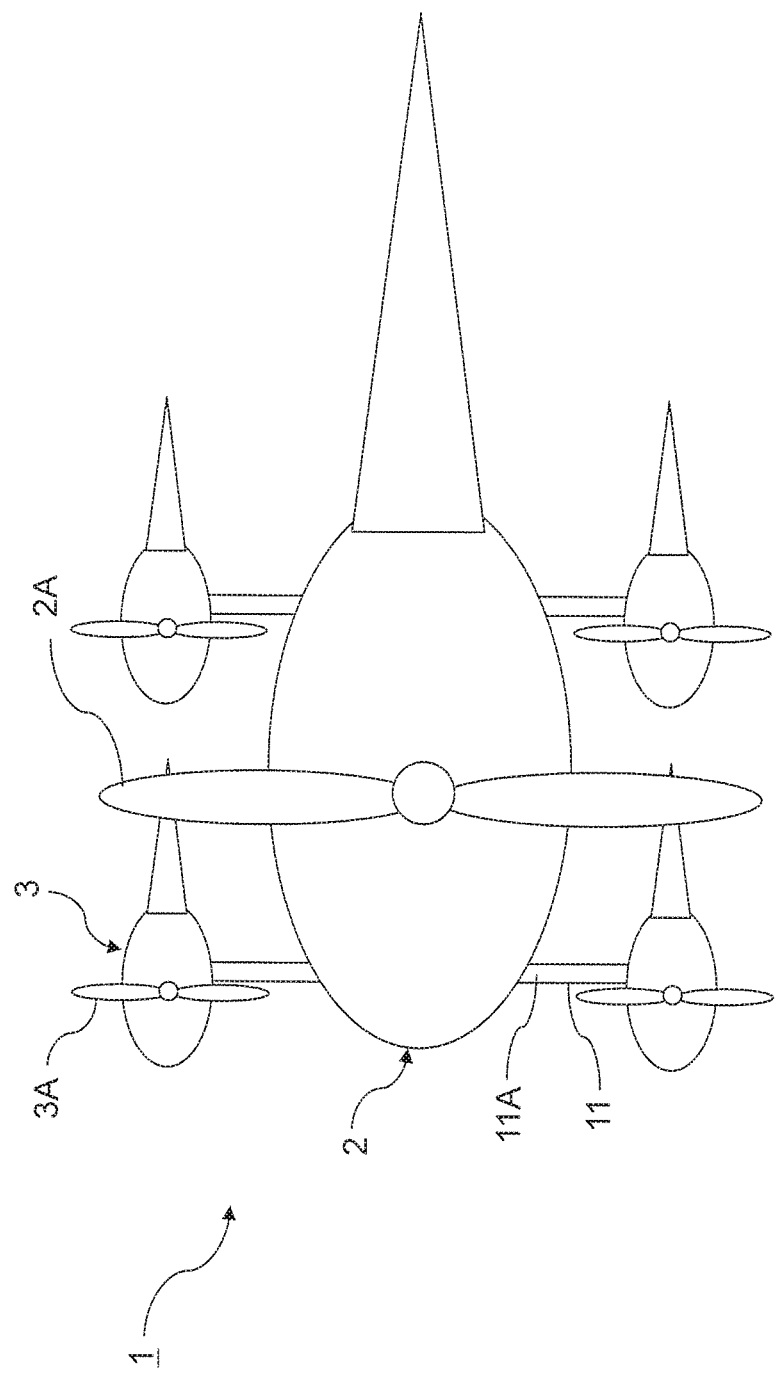
FIG. 8 is a top view showing an example where the slave rotorcrafts of the rotorcraft shown in FIG. 1 are connected to the master rotorcraft at different positions.

FIG. 8 is a top view showing an example where the slave rotorcrafts 3 have been connected to the master rotorcraft 2 of the rotorcraft 1 shown in FIG. 1 at different positions.

FIG. 1 shows an example in which the detachable arms 11A are radially disposed about the master rotorcraft 2 and in which the slave rotorcrafts 3 are detachably and respectively coupled to the radially disposed detachable arms 11A. However, as shown in FIG. 8, the detachable arms 11A may be disposed to parallel one another, and the slave rotorcrafts 3 may be detachably and respectively coupled to the detachable arms. As exemplified in FIGS. 1 and 8, positions at which the slave rotorcrafts 3 are coupled with respect to the master rotorcraft 2 are flexible.

Besides the above-mentioned configurations, the second main rotors 3A included in all or a part of the slave rotorcrafts 3 may be configured to be tilted relative to the master rotorcraft 2. The second main rotors 3A of the slave rotorcrafts 3 to be tilted may also be tilted relative to the slave rotorcrafts 3. Alternatively, the second main rotors 3A to be tilted may be tilted, together with the slave rotorcrafts 3, relative to the master rotorcraft 2.

Figure 9:
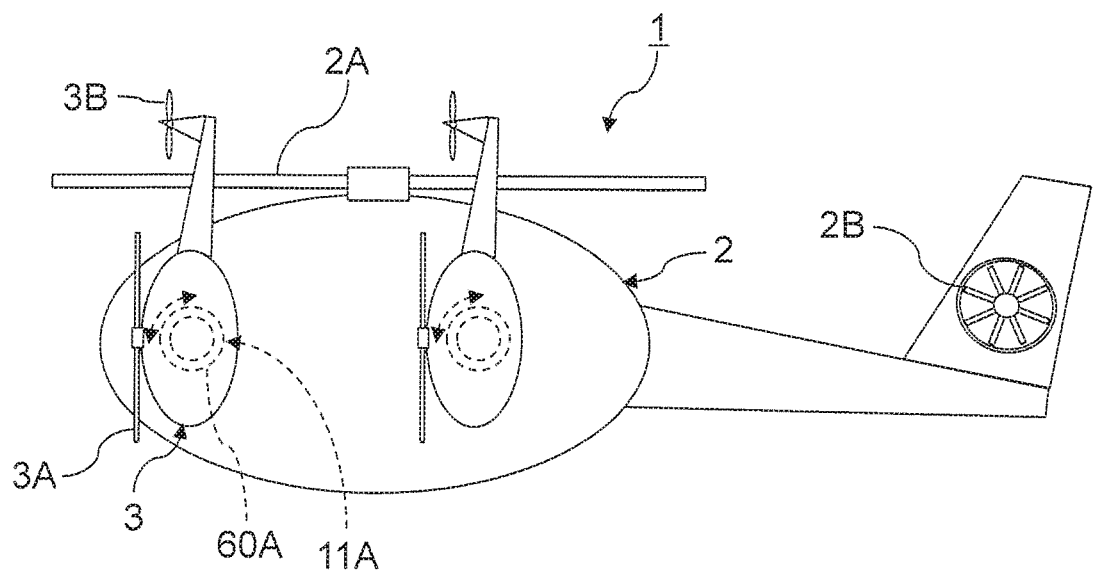
FIG. 9 shows an example in which each of the slave rotorcrafts shown in FIG. 1 is tilted relative to the master rotorcraft.

FIG. 9 shows an example in which each of the slave rotorcrafts 3 shown in FIG. 1 are tilted relative to the master rotorcraft 2.

As shown in FIG. 9, tilt structures 60A, which tilt the slave rotorcrafts 3 relative to the master rotorcraft 2, may be provided to the master rotorcraft 2 or the slave rotorcrafts 3. In this case, the second main rotors 3A can be tilted relative to the master rotorcraft 2 by tilting the slave rotorcrafts 3 themselves relative to the master rotorcraft 2.

As a specific example, the slave rotorcrafts 3 rotate relative to the master rotorcraft 2 by respectively attaching the tilt structures 60A, which have a typical structure for receiving a shaft with a ball bearing, to the detachable arms 11A. Alternatively, as another specific example, when the slave rotorcrafts 3 include the stub wings 47A as exemplified in FIG. 6 and FIG. 7, and when the rotation shaft 51 is provided to each of the stub wings 47A of the slave rotorcrafts 3, the slave rotorcrafts 3 are tilted relative to the master rotorcraft 2 by tilting the stub wings 47A respectively coupled to the detachable arms 11A of the master rotorcraft 2.

Figure 10:
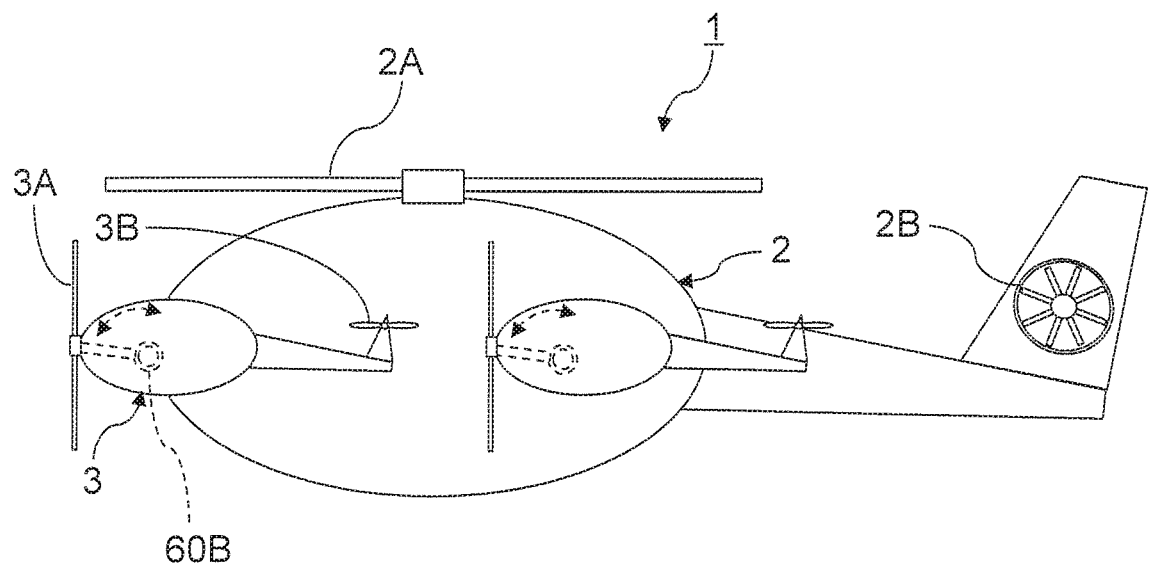
FIG. 10 shows an example in which a second main rotor of each of the slave rotorcrafts shown in FIG. 1 is tilted relative to the slave rotorcraft.

FIG. 10 shows an example in which the second main rotor 3A of each of the slave rotorcrafts 3 shown in FIG. 1 is tilted relative to the slave rotorcraft 3.

As shown in FIG. 10, each of the slave rotorcrafts 3 may be provided with a tilt structure 60B which tilts the second main rotor 3A relative to the slave rotorcraft 3. In this case, the second main rotor 3A tilts relative to the master rotorcraft 2 by tilting the second main rotor 3A relative to the slave rotorcraft 3. Each tilt structure 60B, which tilts the second main rotor 3A relative to the slave rotorcraft 3, may also be composed of known parts, such as a ball bearing and a shaft.

Each of the tilt structure 60A and the tilt structure 60B exemplified in FIG. 9 and FIG. 10 may also be driven by remote control by an operator, by automatic control by a flight program, or by a manual operation by a pilot.

(Method of Controlling Rotorcraft)

Next, a specific example of a method of controlling the rotorcraft 1 will be described.

As mentioned above, the maneuvering of the master rotorcraft 2 and the slave rotorcrafts 3, the control for attachment and detachment between the master rotorcraft 2 and each of the slave rotorcrafts 3, the charging of each slave rotorcraft 3 consisting of an electric rotorcraft, and the control of the tilt structures 60A and the tilt structures 60B are performed according to desired algorithms, such as by remotely controlling the control system 5A of the master rotorcraft 2 and the control systems 5B of the slave rotorcrafts 3 based on operation of the controller 4 by an operator, by automatically controlling according to flight programs stored in the control system 5A of the master rotorcraft 2 and the control systems 5B of the slave rotorcrafts 3, or by manually operating the control system 5A of the master rotorcraft 2 and the control systems 5B of the slave rotorcrafts 3 by a pilot.

As typical examples, there are flight control for flying the master rotorcraft 2 and the slave rotorcrafts 3 coupled to the master rotorcraft 2 to a destination, and detachment control for separating each of the slave rotorcrafts 3 from the master rotorcraft 2 at the destination. That is, after the master rotorcraft 2 arrives at a destination where a mission should be carried out, each of the slave rotorcrafts 3 is separated from the master rotorcraft 2 so that each of the slave rotorcrafts 3 operates as the independent second rotorcraft.

By configuring the master rotor craft 2 and the slave rotorcrafts 3 as mentioned above, when each of the slave rotorcrafts 3 is an electric rotorcraft, the consumption of electric power stored in the batteries 8 of the slave rotorcrafts 3 is reduced by stopping the rotation of the second main rotor 3A and the second tail rotor 3B of each of the slave rotorcrafts 3 while each of the slave rotorcrafts 3 is coupled to the master rotorcraft 2. That is, the consumption of the electric power stored in the batteries 8 of the slave rotorcrafts 3 is reduced by flying the slave rotorcrafts 3 only by the lift force of the master rotorcraft 2 to the destination at which the slave rotorcrafts 3 are separated from the master rotorcraft 2. Meanwhile, even when the slave rotorcrafts 3 have engines, the consumption of aviation fuel is reduced.

Accordingly, the flight range and flight duration of each slave rotorcraft 3 increase. As a result, a mission requiring a longer time and/or a mission at a farther location can be performed. In particular, when the slave rotorcrafts 3 electric rotorcrafts, the weaknesses of electric rotorcrafts, such as a short flight time and a small operational range, can be remarkably improved.

Furthermore, when each of the slave rotorcrafts 3 is an electric rotorcraft in which the second main rotor 3A and the second tail rotor 3B are rotated by the motor 7 driven by the battery 8 while the master rotorcraft 2 is equipped with the engine 6 and at least one of the generator 10 and the battery charger 9, the generator 10 or the battery charger 9 mounted in the master rotorcraft 2 charges the battery 8 used for rotating the second main rotor 3A and the second tail rotor 3B of the slave rotorcraft 3 during a period when the slave rotorcrafts 3 are coupled to the master rotorcraft 2. In this case, the flight range and flight duration of each slave rotorcraft 3 are further increased.

Meanwhile, even when all of the slave rotorcrafts 3 and the master rotorcraft 2 are electric rotorcrafts, equipping the master rotorcraft 2 with the charger 9 such a battery storing sufficient electric power, allows the charger 9 equipped on the master rotorcraft 2 to charge the batteries 8 of the slave rotorcrafts 3 while the slave rotorcrafts 3 are coupled to the master rotorcraft 2. Thereby, the flight range and flight duration of each slave rotorcraft 3 are further increased.

Even during the period when the slave rotorcrafts are coupled to the master rotorcraft 2, the second main rotors 3A of the slave rotorcrafts 3 may be rotated when an increase in the lift force of the whole rotorcraft 1 including the master rotorcraft 2 and the slave rotorcrafts 3 is desired. As a typical example, the second main rotors 3A of the slave rotorcrafts 3 coupled to the master rotorcraft 2 rotates during strong winds.

By rotating the second main rotors 3A of the slave rotorcrafts 3 coupled to the master rotorcraft 2 during strong winds, the resistance characteristics of the rotorcraft 1 against a strong wind improves. Improving the stability of the rotorcraft 1 in the strong wind allows the rotorcraft 1 to fly even in strong winds.

As another example, when the first main rotor 2A of the master rotorcraft 2 breaks down, the second main rotors 3A of the slave rotorcrafts 3 rotate. Thus, the redundancy of the rotorcraft 1 can be secured. In other words, coupling the slave rotorcrafts 3 to the master rotorcraft 2 provides for redundancy to the master rotorcraft 2.

When the slave rotorcrafts 3 are coupled to the master rotorcraft 2, the second main rotors 3A or the slave rotorcrafts 3 may be tilted relative to the master rotorcraft 2, and the tilted second main rotors 3A may be rotated. As a practical example, as exemplified in FIG. 9 or FIG. 10, the flight speed of the rotorcraft 1 is increased by tilting the rotating shafts of the second main rotors 3A from the vertical direction to a traveling direction of the rotorcraft 1 like a tilt rotor, and rotating the tilted second main rotors 3A while the slave rotorcrafts 3 are coupled to the master rotorcraft 2.

Examples of a period when it is desired to increase the lift force of the whole rotorcraft 1 include a period when the rotorcraft 1 is taking off and a period when the rotorcraft 1 is hovering, besides a period when a strong wind is blowing. Thus, when the rotorcraft 1 is taking off or hovering, the second main rotors 3A of the slave rotorcrafts 3 rotate while setting the angles of the second main rotors 3A to that allows the rotorcraft 1 to achieve the desired lift force. Meanwhile, when the rotorcraft 1 is advancing, the second main rotors 3A of the slave rotorcrafts 3 may also rotate while tilting each of the rotating shafts of the second main rotors 3A of the slave rotorcrafts 3 in the traveling direction of the rotorcraft 1, as mentioned above. In this case rotorcraft 1 obtains sufficient lift force for a takeoff or hovering of the rotorcraft 1 while increasing the flight speed of the rotorcraft 1 when the rotorcraft 1 advances.

On the contrary, as mentioned above, the second main rotors 3A of the slave rotorcrafts 3 may be stopped until the slave rotorcrafts 3 are separated from the master rotorcraft 2, unless conditions in which an increase of the lift force is desired. That is, the rotorcraft 1 can be designed so that the rotation of the first main rotor 2A of the master rotorcraft 2 provides sufficient lift force even when the rotations of the second main rotors 3A of the slave rotorcrafts 3 are stopped. Also, the rotorcraft 1 can be designed so that a sufficient lift force is obtained by rotating the second main rotors 3A of the slave rotorcrafts 3 and the first main rotor 2A of the master rotorcraft 2.

When the rotorcraft 1 is designed so that a sufficient lift force is obtained even when the second main rotors 3A of the slave rotorcrafts 3 stop rotating, the flight duration and the flight range of each slave rotorcraft 3 increase as mentioned above. In addition, the rotorcraft 1 achieves the redundancy. On the contrary, when the rotorcraft 1 is designed so that a sufficient lift force is obtained by rotating the second main rotors 3A of the slave rotorcrafts 3 and the first main rotor 2A of the master rotorcraft 2, the lift force required for the master rotorcraft 2 is reduced.

EFFECTS

As described above, the rotorcraft 1 and the method of controlling the rotorcraft 1 allow for at least one slave rotorcraft 3, which includes of a rotorcraft and flies independently, to be attached to and detached from the master rotorcraft 2 which includes another rotorcraft and flies independently.

According to the rotorcraft 1 and the method of controlling the rotorcraft 1, when a mission requires to be simultaneously operated by a plurality of rotorcrafts, the rotorcraft 1 flies from a takeoff point to a targeted area as a single rotorcraft. On the contrary, after completing the mission, the plurality of the rotorcrafts including the master rotorcraft 2 and the slave rotorcrafts 3 return as the single rotorcraft 1 after the mission has been completed. As a result, maneuvering the plurality of the rotorcrafts including the master rotorcraft 2 and the slave rotorcrafts 3 can be made easy.

In particular, when the slave rotorcrafts 3 are electric rotorcrafts, coupling the slave rotorcraft 3 to the master rotorcraft 2 increases the flight range and flight duration of the slave rotorcrafts 3. Moreover, mounting the generator 10 or the battery charger 9 onto the master rotorcraft 2 allows each of the electric slave rotorcrafts 3 coupled to the master rotorcraft 2 to be charged. As a result, the flight range and flight duration of each slave rotorcraft 3 further increases.

OTHER IMPLEMENTATIONS

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A method of controlling a rotorcraft,
   wherein the rotorcraft comprises:
   a first rotorcraft having a first main rotor and a first tail rotor; and
   at least one second rotorcraft having a second main rotor and a second tail rotor, the at least one second rotorcraft being attachable and detachable to and from the first rotorcraft,
   wherein the second main rotor of the at least one second rotorcraft rotates electrically,
   wherein the at least one second rotorcraft includes a battery providing power to the second main rotor to electrically rotate the second main rotor,
   wherein the first rotorcraft has at least one of a charger and a generator, wherein, during a period of when the at least one second rotorcraft is attached to the first rotorcraft while flying, the at least one of the charger and the generator of the first rotorcraft charges the battery of the at least one second rotorcraft to allow the battery to provide the power to the second main rotor of the at least one second rotorcraft, and
   wherein the method comprises:
   flying the first rotorcraft, to which the at least one second rotorcraft is attached, to a destination;
   separating the at least one second rotorcraft from the first rotorcraft at the destination; and halting the rotation of the second main rotor until the at least one second rotorcraft is separated from the first rotorcraft, unless a condition in which a lift force should be increased is satisfied.

2. The method according to claim 1, further comprising rotating the first main rotor by an engine.

3. The method according to claim 1, wherein the first rotorcraft or the at least one second rotorcraft of the rotorcraft being controlled by the method has a tilt structure, the tilt structure having a shaft and a ball bearing, the ball bearing receiving the shaft, the tilt structure being configured to tilt the second main rotor relative to the at least one second rotorcraft or tilt the at least one second rotorcraft relative to the first rotorcraft.

4. The method according to claim 1, wherein both the first rotorcraft and the at least one second rotorcraft of the rotorcraft being controlled by the method are unmanned aircrafts.

5. A method of controlling a rotorcraft,
wherein the rotorcraft comprises:
a first rotorcraft having a first main rotor and a first tail rotor; and
at least one second rotorcraft having a second main rotor and a second tail rotor, the at least one second rotorcraft being attachable and detachable to and from the first rotorcraft,
wherein the second main rotor of the at least one second rotorcraft rotates electrically,
wherein the at least one second rotorcraft includes a battery providing power to the second main rotor to electrically rotate the second main rotor,
wherein the first rotorcraft has at least one of a charger and a generator,
wherein, during a period of when the at least one second rotorcraft is attached to the first rotorcraft while flying, the at least one of the charger and the generator of the first rotorcraft charges the battery of the at least one second rotorcraft to allow the battery to provide the power to the second main rotor of the at least one second rotorcraft, and
wherein the method comprises:
flying the first rotorcraft, to which the at least one second rotorcraft is attached, to a destination;
separating the at least one second rotorcraft from the first rotorcraft at the destination; and
controlling the second main rotor of the at least one second rotorcraft to rotate when the first main rotor breaks down.

6. The method according to claim 5, further comprising rotating the first main rotor by an engine.

7. The method according to claim 5, wherein the first rotorcraft or the at least one second rotorcraft of the rotorcraft being controlled by the method has a tilt structure, the tilt structure having a shaft and a ball bearing, the ball bearing receiving the shaft, the tilt structure being configured to tilt the second main rotor relative to the at least one second rotorcraft or tilt the at least one second rotorcraft relative to the first rotorcraft.

8. The method according to claim 5, wherein both the first rotorcraft and the at least one second rotorcraft of the rotorcraft being controlled by the method are unmanned aircrafts.

9. A method of controlling a rotorcraft,
wherein the rotorcraft comprises:
a first rotorcraft having a first main rotor and a first tail rotor; and
at least one second rotorcraft having a second main rotor and a second tail rotor, the at least one second rotorcraft being attachable and detachable to and from the first rotorcraft,
wherein the second main rotor of the at least one second rotorcraft rotates electrically,
wherein the at least one second rotorcraft includes a battery providing power to the second main rotor to electrically rotate the second main rotor,
wherein the first rotorcraft has at least one of a charger and a generator,
wherein, during a period of when the at least one second rotorcraft is attached to the first rotorcraft while flying, the at least one of the charger and the generator of the first rotorcraft charges the battery of the at least one second rotorcraft to allow the battery to provide the power to the second main rotor of the at least one second rotorcraft, and
wherein the method comprises:
flying the first rotorcraft, to which the at least one second rotorcraft is attached, to a destination;
separating the at least one second rotorcraft from the first rotorcraft at the destination; and
increasing a flight speed by tilting the second main rotor or the at least one second rotorcraft and rotating the second main rotor, during a period when the at least one second rotorcraft is attached to the first rotorcraft.

10. The method according to claim 9, further comprising rotating the first main rotor by an engine.

11. The method according to claim 9, wherein the first rotorcraft or the at least one second rotorcraft of the rotorcraft being controlled by the method has a tilt structure, the tilt structure having a shaft and a ball bearing, the ball bearing receiving the shaft, the tilt structure being configured to tilt the second main rotor relative to the at least one second rotorcraft or tilt the at least one second rotorcraft relative to the first rotorcraft.

12. The method according to claim 9, wherein both the first rotorcraft and the at least one second rotorcraft of the rotorcraft being controlled by the method are unmanned aircrafts.

* * * * *